United States Patent
Heap et al.

(10) Patent No.: US 8,433,486 B2
(45) Date of Patent: Apr. 30, 2013

(54) METHOD AND APPARATUS TO DETERMINE A PREFERRED OPERATING POINT FOR AN ENGINE OF A POWERTRAIN SYSTEM USING AN ITERATIVE SEARCH

(75) Inventors: Anthony H. Heap, Ann Arbor, MI (US); Bin Wu, Troy, MI (US); Wilfried Brunssen, Ypsilanti, MI (US); Jason J McConnell, Ypsilanti, MI (US); Kee Yong Kim, Ann Arbor, MI (US); Brian R Medema, Waterford, MI (US)

(73) Assignees: GM Global Technology Operations LLC, Detroit, MI (US); Daimler AG, Stuttgart (DE); Chrysler Group LLC, Auburn Hills, MI (US); Bayerische Motoren Werke Aktiengesellschaft, Munich (DE)

( * ) Notice: Subject to any disclaimer, the term of this patent is extended or adjusted under 35 U.S.C. 154(b) by 1248 days.

(21) Appl. No.: 12/239,893

(22) Filed: Sep. 29, 2008

(65) Prior Publication Data

US 2009/0118927 A1 May 7, 2009

Related U.S. Application Data

(60) Provisional application No. 60/985,984, filed on Nov. 7, 2007.

(51) Int. Cl.
*G06F 17/00* (2006.01)

(52) U.S. Cl.
USPC ............. 701/54; 701/22; 701/51; 701/53; 701/99; 701/112; 477/3; 477/5; 475/5; 180/65.265

(58) Field of Classification Search ................. None
See application file for complete search history.

(56) References Cited

U.S. PATENT DOCUMENTS

| | | | |
|---|---|---|---|
| 6,173,574 B1 * | 1/2001 | Obayashi et al. | 60/710 |
| 6,400,993 B1 * | 6/2002 | Oberg | 700/33 |
| 6,594,575 B2 * | 7/2003 | Pflugl et al. | 701/102 |
| 6,671,603 B2 * | 12/2003 | Cari et al. | 701/54 |
| 6,832,148 B1 | 12/2004 | Bennett | |
| 6,868,318 B1 | 3/2005 | Cawthorne | |
| 6,957,137 B2 * | 10/2005 | Hubbard et al. | 701/54 |
| 7,076,356 B2 * | 7/2006 | Hubbard et al. | 701/55 |
| 7,110,871 B2 * | 9/2006 | Hubbard et al. | 701/54 |
| 7,154,236 B1 | 12/2006 | Heap | |
| 7,398,147 B2 * | 7/2008 | Kozarekar et al. | 701/101 |
| 7,801,662 B2 * | 9/2010 | Kozarekar et al. | 701/101 |
| 8,041,495 B2 * | 10/2011 | Kozarekar et al. | 701/101 |

(Continued)

FOREIGN PATENT DOCUMENTS

EP  0 365 003 A2  4/1990

OTHER PUBLICATIONS

Nocedal et al., Numerical Optimization, 2006, Springer Science+Business Media LLC, 2nd Edition, pp. 1-29, 66-100.*

*Primary Examiner* — Thomas Black
*Assistant Examiner* — Wae Louie (57) ABSTRACT

A method to determine a preferred operating point for an internal combustion engine includes determining a current set of candidate operating points for a current search iteration. The method further includes iteratively determining an operating cost for operating the internal combustion engine at each candidate operating point of the current search iteration, and determining the preferred operating point for operating the internal combustion engine after a predetermined number of search iterations.

18 Claims, 6 Drawing Sheets

U.S. PATENT DOCUMENTS

| | | | |
|---|---|---|---|
| 8,079,933 B2 * | 12/2011 | Kaminsky et al. ............... 477/5 |
| 2005/0076958 A1 | 4/2005 | Foster |
| 2005/0077867 A1 | 4/2005 | Cawthorne |
| 2005/0077877 A1 | 4/2005 | Cawthorne |
| 2005/0080523 A1 | 4/2005 | Bennett |
| 2005/0080527 A1 | 4/2005 | Tao |
| 2005/0080535 A1 | 4/2005 | Steinmetz |
| 2005/0080537 A1 | 4/2005 | Cawthorne |
| 2005/0080538 A1 | 4/2005 | Hubbard |
| 2005/0080539 A1 | 4/2005 | Hubbard |
| 2005/0080540 A1 | 4/2005 | Steinmetz |
| 2005/0080541 A1 | 4/2005 | Sah |
| 2005/0182526 A1 * | 8/2005 | Hubbard et al. ............... 701/1 |
| 2005/0182543 A1 | 8/2005 | Sah |
| 2005/0182546 A1 | 8/2005 | Hsieh |
| 2005/0182547 A1 | 8/2005 | Sah |
| 2005/0189918 A1 | 9/2005 | Weisgerber |
| 2005/0252283 A1 | 11/2005 | Heap |
| 2005/0252305 A1 | 11/2005 | Hubbard |
| 2005/0252474 A1 | 11/2005 | Sah |
| 2005/0255963 A1 | 11/2005 | Hsieh |
| 2005/0255964 A1 | 11/2005 | Heap |
| 2005/0255965 A1 | 11/2005 | Tao |
| 2005/0255966 A1 | 11/2005 | Tao |
| 2005/0255967 A1 | 11/2005 | Foster |
| 2005/0255968 A1 | 11/2005 | Sah |
| 2005/0256617 A1 | 11/2005 | Cawthorne |
| 2005/0256618 A1 | 11/2005 | Hsieh |
| 2005/0256623 A1 | 11/2005 | Hubbard |
| 2005/0256625 A1 | 11/2005 | Sah |
| 2005/0256626 A1 | 11/2005 | Hsieh |
| 2005/0256627 A1 | 11/2005 | Sah |
| 2005/0256629 A1 | 11/2005 | Tao |
| 2005/0256631 A1 | 11/2005 | Cawthorne |
| 2005/0256633 A1 | 11/2005 | Heap |
| 2005/0256919 A1 | 11/2005 | Cawthorne |
| 2006/0194670 A1 | 8/2006 | Heap |
| 2007/0078580 A1 | 4/2007 | Cawthorne |
| 2007/0093953 A1 | 4/2007 | Heap |
| 2007/0149348 A1 | 6/2007 | Holmes |
| 2007/0191181 A1 | 8/2007 | Burns |
| 2007/0202987 A1 | 8/2007 | Kakinami et al. |
| 2007/0225886 A1 | 9/2007 | Morris |
| 2007/0225887 A1 | 9/2007 | Morris |
| 2007/0225888 A1 | 9/2007 | Morris |
| 2007/0225889 A1 | 9/2007 | Morris |
| 2007/0260381 A1 | 11/2007 | Sah |
| 2007/0276569 A1 | 11/2007 | Sah |
| 2007/0284162 A1 | 12/2007 | Zettel |
| 2007/0284163 A1 | 12/2007 | Heap |
| 2007/0284176 A1 | 12/2007 | Sah |
| 2007/0285059 A1 | 12/2007 | Zettel |
| 2007/0285060 A1 | 12/2007 | Zettel |
| 2007/0285061 A1 | 12/2007 | Zettel |
| 2007/0285063 A1 | 12/2007 | Zettel |
| 2007/0285097 A1 | 12/2007 | Zettel |
| 2008/0004779 A1 | 1/2008 | Sah |
| 2008/0028879 A1 | 2/2008 | Robinette |
| 2008/0032855 A1 | 2/2008 | Sah |
| 2008/0064559 A1 | 3/2008 | Cawthorne |
| 2008/0064562 A1 | 3/2008 | Zettel |
| 2008/0103003 A1 | 5/2008 | Sah |
| 2008/0119320 A1 | 5/2008 | Wu |
| 2008/0119321 A1 | 5/2008 | Heap |
| 2008/0120000 A1 | 5/2008 | Heap |
| 2008/0120001 A1 | 5/2008 | Heap |
| 2008/0120002 A1 | 5/2008 | Heap |
| 2008/0176706 A1 | 7/2008 | Wu |
| 2008/0176709 A1 | 7/2008 | Wu |
| 2008/0181280 A1 | 7/2008 | Wang |
| 2008/0182696 A1 | 7/2008 | Sah |
| 2008/0183372 A1 | 7/2008 | Snyder |
| 2008/0234097 A1 | 9/2008 | Sah |
| 2008/0236921 A1 | 10/2008 | Huseman |
| 2008/0243346 A1 | 10/2008 | Huseman |
| 2008/0249745 A1 | 10/2008 | Heap |
| 2008/0262694 A1 | 10/2008 | Heap |
| 2008/0262698 A1 | 10/2008 | Lahti |
| 2008/0272717 A1 | 11/2008 | Gleason |
| 2008/0275611 A1 | 11/2008 | Snyder |
| 2008/0275624 A1 | 11/2008 | Snyder |
| 2008/0275625 A1 | 11/2008 | Snyder |
| 2008/0287255 A1 | 11/2008 | Snyder |
| 2009/0069148 A1 | 3/2009 | Heap |
| 2009/0069989 A1 | 3/2009 | Heap |
| 2009/0070019 A1 | 3/2009 | Heap |
| 2009/0082170 A1 | 3/2009 | Heap |
| 2009/0088294 A1 | 4/2009 | West |
| 2009/0105039 A1 | 4/2009 | Sah |
| 2009/0105896 A1 | 4/2009 | Tamai |
| 2009/0105898 A1 | 4/2009 | Wu |
| 2009/0105914 A1 | 4/2009 | Buur |
| 2009/0107745 A1 | 4/2009 | Buur |
| 2009/0107755 A1 | 4/2009 | Kothari |
| 2009/0108673 A1 | 4/2009 | Wang |
| 2009/0111637 A1 | 4/2009 | Day |
| 2009/0111640 A1 | 4/2009 | Buur |
| 2009/0111642 A1 | 4/2009 | Sah |
| 2009/0111643 A1 | 4/2009 | Sah |
| 2009/0111644 A1 | 4/2009 | Kaminsky |
| 2009/0111645 A1 | 4/2009 | Heap |
| 2009/0112385 A1 | 4/2009 | Heap |
| 2009/0112392 A1 | 4/2009 | Buur |
| 2009/0112399 A1 | 4/2009 | Buur |
| 2009/0112412 A1 | 4/2009 | Cawthorne |
| 2009/0112416 A1 | 4/2009 | Heap |
| 2009/0112417 A1 | 4/2009 | Kaminsky |
| 2009/0112418 A1 | 4/2009 | Buur |
| 2009/0112419 A1 | 4/2009 | Heap |
| 2009/0112420 A1 | 4/2009 | Buur |
| 2009/0112421 A1 | 4/2009 | Sah |
| 2009/0112422 A1 | 4/2009 | Sah |
| 2009/0112423 A1 | 4/2009 | Foster |
| 2009/0112427 A1 | 4/2009 | Heap |
| 2009/0112428 A1 | 4/2009 | Sah |
| 2009/0112429 A1 | 4/2009 | Sah |
| 2009/0112495 A1 | 4/2009 | Center |
| 2009/0115349 A1 | 5/2009 | Heap |
| 2009/0115350 A1 | 5/2009 | Heap |
| 2009/0115351 A1 | 5/2009 | Heap |
| 2009/0115352 A1 | 5/2009 | Heap |
| 2009/0115353 A1 | 5/2009 | Heap |
| 2009/0115354 A1 | 5/2009 | Heap |
| 2009/0115365 A1 | 5/2009 | Heap |
| 2009/0115373 A1 | 5/2009 | Kokotovich |
| 2009/0115377 A1 | 5/2009 | Schwenke |
| 2009/0115408 A1 | 5/2009 | West |
| 2009/0115491 A1 | 5/2009 | Anwar |
| 2009/0118074 A1 | 5/2009 | Zettel |
| 2009/0118075 A1 | 5/2009 | Heap |
| 2009/0118076 A1 | 5/2009 | Heap |
| 2009/0118077 A1 | 5/2009 | Hsieh |
| 2009/0118078 A1 | 5/2009 | Wilmanowicz |
| 2009/0118079 A1 | 5/2009 | Heap |
| 2009/0118080 A1 | 5/2009 | Heap |
| 2009/0118081 A1 | 5/2009 | Heap |
| 2009/0118082 A1 | 5/2009 | Heap |
| 2009/0118083 A1 | 5/2009 | Kaminsky |
| 2009/0118084 A1 | 5/2009 | Heap |
| 2009/0118085 A1 | 5/2009 | Heap |
| 2009/0118086 A1 | 5/2009 | Heap |
| 2009/0118087 A1 | 5/2009 | Hsieh |
| 2009/0118089 A1 | 5/2009 | Heap |
| 2009/0118090 A1 | 5/2009 | Heap |
| 2009/0118091 A1 | 5/2009 | Lahti |
| 2009/0118093 A1 | 5/2009 | Heap |
| 2009/0118094 A1 | 5/2009 | Hsieh |
| 2009/0118877 A1 | 5/2009 | Center |
| 2009/0118879 A1 | 5/2009 | Heap |
| 2009/0118880 A1 | 5/2009 | Heap |
| 2009/0118882 A1 | 5/2009 | Heap |
| 2009/0118883 A1 | 5/2009 | Heap |
| 2009/0118884 A1 | 5/2009 | Heap |
| 2009/0118885 A1 | 5/2009 | Heap |
| 2009/0118886 A1 | 5/2009 | Tamai |
| 2009/0118887 A1 | 5/2009 | Minarcin |
| 2009/0118888 A1 | 5/2009 | Minarcin |

| | | | | | |
|---|---|---|---|---|---|
| 2009/0118901 A1 | 5/2009 | Cawthorne | 2009/0118939 A1 | 5/2009 | Heap |
| 2009/0118914 A1 | 5/2009 | Schwenke | 2009/0118940 A1* | 5/2009 | Heap et al. .................... 701/54 |
| 2009/0118915 A1 | 5/2009 | Heap | 2009/0118941 A1* | 5/2009 | Heap ............................. 701/54 |
| 2009/0118916 A1 | 5/2009 | Kothari | 2009/0118942 A1 | 5/2009 | Hsieh |
| 2009/0118917 A1 | 5/2009 | Sah | 2009/0118943 A1 | 5/2009 | Heap |
| 2009/0118918 A1 | 5/2009 | Heap | 2009/0118944 A1 | 5/2009 | Heap |
| 2009/0118919 A1 | 5/2009 | Heap | 2009/0118945 A1 | 5/2009 | Heap |
| 2009/0118920 A1 | 5/2009 | Heap | 2009/0118946 A1 | 5/2009 | Heap |
| 2009/0118921 A1 | 5/2009 | Heap | 2009/0118947 A1 | 5/2009 | Heap |
| 2009/0118922 A1 | 5/2009 | Heap | 2009/0118948 A1 | 5/2009 | Heap |
| 2009/0118923 A1 | 5/2009 | Heap | 2009/0118949 A1 | 5/2009 | Heap |
| 2009/0118924 A1 | 5/2009 | Heap | 2009/0118950 A1 | 5/2009 | Heap |
| 2009/0118925 A1 | 5/2009 | Hsieh | 2009/0118951 A1 | 5/2009 | Heap |
| 2009/0118926 A1 | 5/2009 | Heap | 2009/0118952 A1 | 5/2009 | Heap |
| 2009/0118927 A1* | 5/2009 | Heap et al. .................... 701/54 | 2009/0118954 A1 | 5/2009 | Wu |
| 2009/0118928 A1 | 5/2009 | Heap | 2009/0118957 A1 | 5/2009 | Heap |
| 2009/0118929 A1 | 5/2009 | Heap | 2009/0118962 A1 | 5/2009 | Heap |
| 2009/0118930 A1 | 5/2009 | Heap | 2009/0118963 A1* | 5/2009 | Heap ............................. 701/99 |
| 2009/0118931 A1 | 5/2009 | Kaminsky | 2009/0118964 A1 | 5/2009 | Snyder |
| 2009/0118932 A1 | 5/2009 | Heap | 2009/0118969 A1 | 5/2009 | Heap |
| 2009/0118933 A1 | 5/2009 | Heap | 2009/0118971 A1 | 5/2009 | Heap |
| 2009/0118934 A1* | 5/2009 | Heap ............................. 701/54 | 2009/0118999 A1 | 5/2009 | Heap |
| 2009/0118935 A1* | 5/2009 | Heap et al. .................... 701/54 | 2009/0144002 A1 | 6/2009 | Zettel |
| 2009/0118936 A1 | 5/2009 | Heap | | | |
| 2009/0118937 A1 | 5/2009 | Heap | | | |
| 2009/0118938 A1* | 5/2009 | Heap ............................. 701/54 | * cited by examiner | | |

METHOD AND APPARATUS TO DETERMINE A PREFERRED OPERATING POINT FOR AN ENGINE OF A POWERTRAIN SYSTEM USING AN ITERATIVE SEARCH

CROSS REFERENCE TO RELATED APPLICATION

This application claims the benefit of U.S. Provisional Application No. 60/985,984 filed on Nov. 7, 2007 which is hereby incorporated herein by reference.

TECHNICAL FIELD

This disclosure is related to powertrain control within hybrid vehicles.

BACKGROUND

The statements in this section merely provide background information related to the present disclosure and may not constitute prior art.

Known powertrain architectures include torque-generative devices, including internal combustion engines and electric machines, which transmit torque through a transmission device to an output member. One exemplary powertrain includes a two-mode, compound-split, electro-mechanical transmission which utilizes an input member for receiving motive torque from a prime mover power source, preferably an internal combustion engine, and an output member. The output member can be operatively connected to a driveline for a motor vehicle for transmitting tractive torque thereto. Electric machines, operative as motors or generators, generate a torque input to the transmission, independently of a torque input from the internal combustion engine. The electric machines may transform vehicle kinetic energy, transmitted through the vehicle driveline, to electrical energy that is storable in an electrical energy storage device. A control system monitors various inputs from the vehicle and the operator and provides operational control of the powertrain, including controlling transmission operating state and gear shifting, controlling the torque-generative devices, and regulating the electrical power interchange among the electrical energy storage device and the electric machines to manage outputs of the transmission, including torque and rotational speed.

SUMMARY

A method to determine a preferred operating point for an internal combustion engine mechanically coupled to an electro-mechanical transmission to transmit power to a driveline in response to an operator torque request includes determining a current set of candidate operating points for a current search iteration. The method further includes iteratively determining an operating cost for operating the internal combustion engine at each candidate operating point of the current search iteration, iteratively determining a candidate operating point for the current search iteration having a lowest operating cost, iteratively determining a search direction relative to the current set of candidate operating points for the current search iteration based on the candidate operating point of the current search iteration having the lowest operating cost, and iteratively determining a subsequent set of candidate operating points for a subsequent search iteration based upon the search direction. The preferred operating point for operating the internal combustion engine is determined comprising the candidate operating point with the lowest operating cost determined after a predetermined number of search iterations.

BRIEF DESCRIPTION OF THE DRAWINGS

One or more embodiments will now be described, by way of example, with reference to the accompanying drawings, in which.

DETAILED DESCRIPTION

Figure 1:
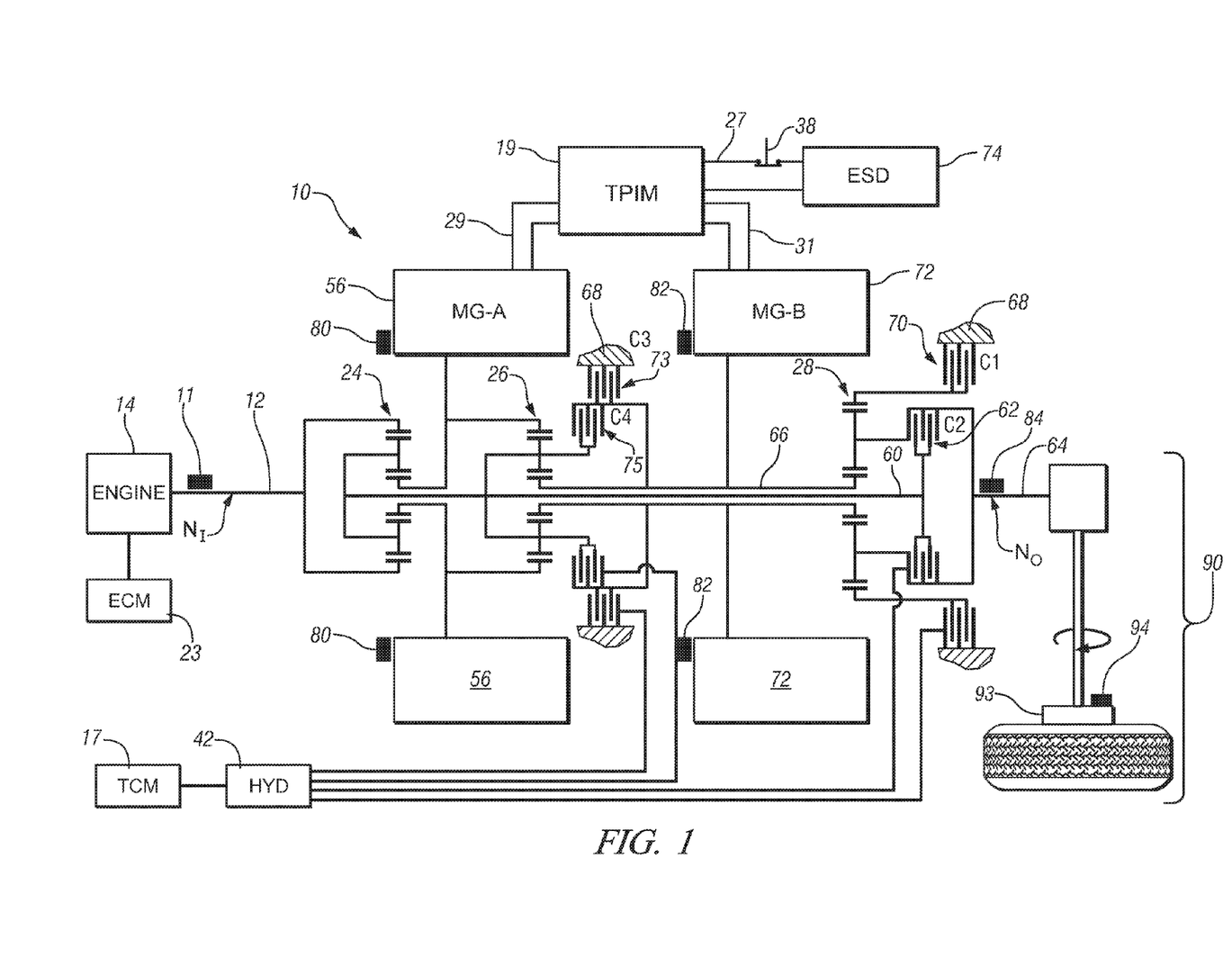
FIG. 1 is a schematic diagram of an exemplary powertrain, in accordance with the present disclosure.
Figure 2:
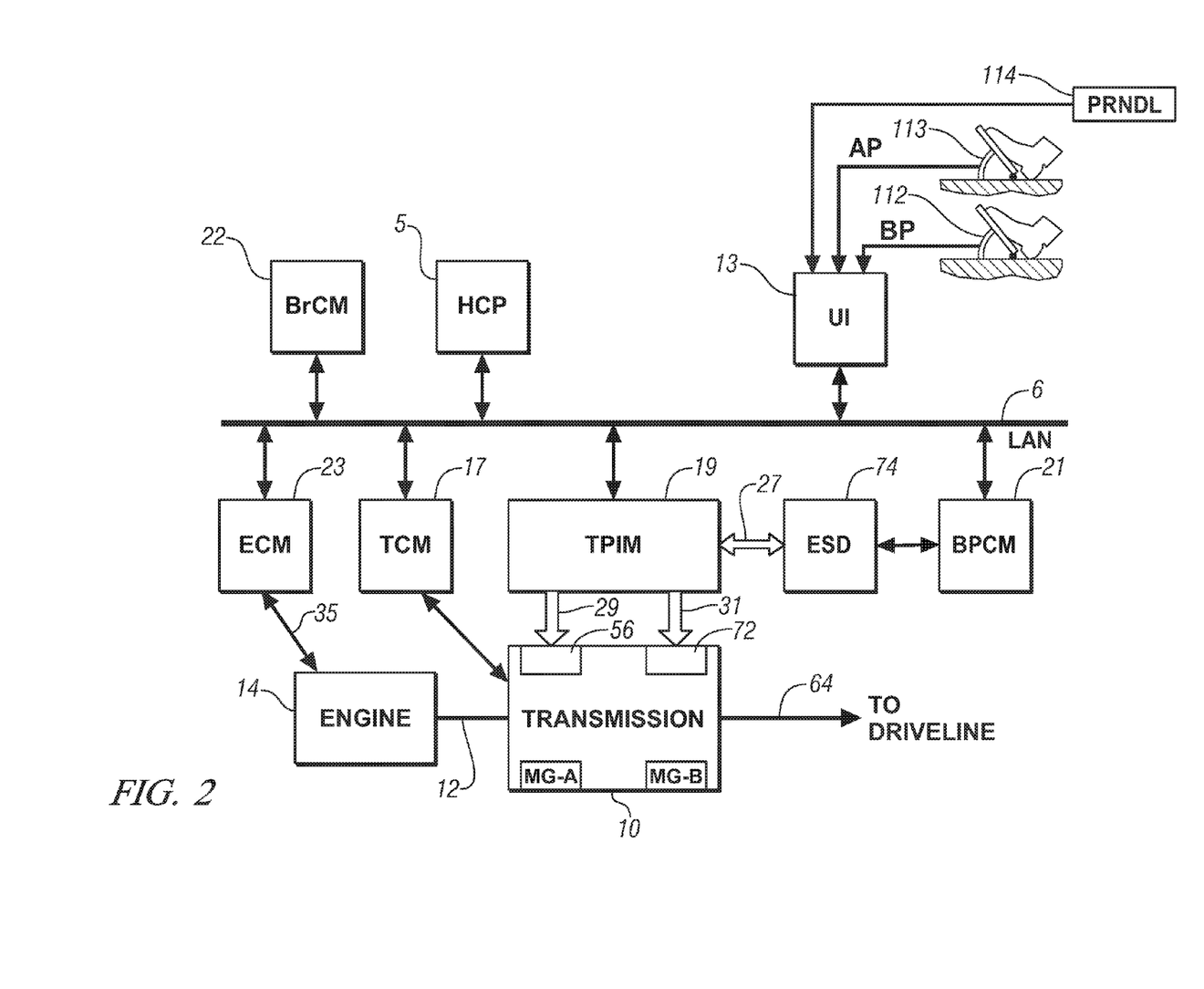
FIG. 2 is a schematic diagram of an exemplary architecture for a control system and powertrain, in accordance with the present disclosure.

Referring now to the drawings, wherein the showings are for the purpose of illustrating certain exemplary embodiments only and not for the purpose of limiting the same, FIGS. 1 and 2 depict an exemplary electro-mechanical hybrid powertrain. The exemplary electro-mechanical hybrid powertrain in accordance with the present disclosure is depicted in FIG. 1, comprising a two-mode, compound-split, electro-mechanical hybrid transmission 10 operatively connected to an engine 14 and first and second electric machines ('MG-A') 56 and ('MG-B') 72. The engine 14 and first and second electric machines 56 and 72 each generate power which can be transferred to the transmission 10. The power generated by the engine 14 and the first and second electric machines 56 and 72 and transferred to the transmission 10 is described in terms of input and motor torques, referred to herein as $T_I$, $T_A$, and $T_B$ respectively, and speed, referred to herein as $N_I$, $N_A$, and $N_B$, respectively.

The exemplary engine 14 comprises a multi-cylinder internal combustion engine selectively operative in several states to transfer torque to the transmission 10 via an input shaft 12, and can be either a spark-ignition or a compression-ignition engine. The engine 14 includes a crankshaft (not shown) operatively coupled to the input shaft 12 of the transmission 10. A rotational speed sensor 11 monitors rotational speed of the input shaft 12. Power output from the engine 14, comprising rotational speed and engine torque, can differ from the input speed $N_I$ and the input torque $T_I$ to the transmission 10 due to placement of torque-consuming components on the input shaft 12 between the engine 14 and the transmission 10, e.g., a hydraulic pump (not shown) and/or a torque management device (not shown).

The exemplary transmission 10 comprises three planetary-gear sets 24, 26 and 28, and four selectively engageable torque-transferring devices, i.e., clutches C1 70, C2 62, C3 73, and C4 75. As used herein, clutches refer to any type of friction torque transfer device including single or compound plate clutches or packs, band clutches, and brakes, for example. A hydraulic control circuit 42, preferably controlled by a transmission control module (hereafter 'TCM') 17, is operative to control clutch states. Clutches C2 62 and C4 75 preferably comprise hydraulically-applied rotating friction clutches. Clutches C1 70 and C3 73 preferably comprise hydraulically-controlled stationary devices that can be selectively grounded to a transmission case 68. Each of the clutches C1 70, C2 62, C3 73, and C4 75 is preferably hydraulically applied, selectively receiving pressurized hydraulic fluid via the hydraulic control circuit 42.

The first and second electric machines 56 and 72 preferably comprise three-phase AC machines, each including a stator (not shown) and a rotor (not shown), and respective resolvers 80 and 82. The motor stator for each machine is grounded to an outer portion of the transmission case 68, and includes a stator core with coiled electrical windings extending therefrom. The rotor for the first electric machine 56 is supported on a hub plate gear that is operatively attached to shaft 60 via the second planetary gear set 26. The rotor for the second electric machine 72 is fixedly attached to a sleeve shaft hub 66.

Each of the resolvers 80 and 82 preferably comprises a variable reluctance device including a resolver stator (not shown) and a resolver rotor (not shown). The resolvers 80 and 82 are appropriately positioned and assembled on respective ones of the first and second electric machines 56 and 72. Stators of respective ones of the resolvers 80 and 82 are operatively connected to one of the stators for the first and second electric machines 56 and 72. The resolver rotors are operatively connected to the rotor for the corresponding first and second electric machines 56 and 72. Each of the resolvers 80 and 82 is signally and operatively connected to a transmission power inverter control module (hereafter 'TPIM') 19, and each senses and monitors rotational position of the resolver rotor relative to the resolver stator, thus monitoring rotational position of respective ones of first and second electric machines 56 and 72. Additionally, the signals output from the resolvers 80 and 82 are interpreted to provide the rotational speeds for first and second electric machines 56 and 72, i.e., $N_A$ and $N_B$, respectively.

The transmission 10 includes an output member 64, e.g. a shaft, which is operably connected to a driveline 90 for a vehicle (not shown), to provide output power to the driveline 90 that is transferred to vehicle wheels 93, one of which is shown in FIG. 1. The output power at the output member 64 is characterized in terms of an output rotational speed $N_O$ and an output torque $T_O$. A transmission output speed sensor 84 monitors rotational speed and rotational direction of the output member 64. Each of the vehicle wheels 93 is preferably equipped with a sensor 94 adapted to monitor wheel speed, $V_{SS\text{-}WHL}$, the output of which is monitored by a control module of a distributed control module system described with respect to FIG. 2, to determine vehicle speed, and absolute and relative wheel speeds for braking control, traction control, and vehicle acceleration management.

The input torque from the engine 14 and the motor torques from the first and second electric machines 56 and 72 ($T_I$, $T_A$, and $T_B$ respectively) are generated as a result of energy conversion from fuel or electrical potential stored in an electrical energy storage device (hereafter 'ESD') 74. The ESD 74 is high voltage DC-coupled to the TPIM 19 via DC transfer conductors 27. The transfer conductors 27 include a contactor switch 38. When the contactor switch 38 is closed, under normal operation, electric current can flow between the ESD 74 and the TPIM 19. When the contactor switch 38 is opened electric current flow between the ESD 74 and the TPIM 19 is interrupted. The TPIM 19 transmits electrical power to and from the first electric machine 56 by transfer conductors 29, and the TPIM 19 similarly transmits electrical power to and from the second electric machine 72 by transfer conductors 31 to meet the torque commands for the first and second electric machines 56 and 72 in response to the motor torques $T_A$ and $T_B$. Electrical current is transmitted to and from the ESD 74 in accordance with whether the ESD 74 is being charged or discharged.

The TPIM 19 includes the pair of power inverters (not shown) and respective motor control modules (not shown) configured to receive the torque commands and control inverter states therefrom for providing motor drive or regeneration functionality to meet the commanded motor torques $T_A$ and $T_B$. The power inverters comprise known complementary three-phase power electronics devices, and each includes a plurality of insulated gate bipolar transistors (not shown) for converting DC power from the ESD 74 to AC power for powering respective ones of the first and second electric machines 56 and 72, by switching at high frequencies. The insulated gate bipolar transistors form a switch mode power supply configured to receive control commands. There is typically one pair of insulated gate bipolar transistors for each phase of each of the three-phase electric machines. States of the insulated gate bipolar transistors are controlled to provide motor drive mechanical power generation or electric power regeneration functionality. The three-phase inverters receive or supply DC electric power via DC transfer conductors 27 and transform it to or from three-phase AC power, which is conducted to or from the first and second electric machines 56 and 72 for operation as motors or generators via transfer conductors 29 and 31 respectively.

FIG. 2 is a schematic block diagram of the distributed control module system. The elements described hereinafter comprise a subset of an overall vehicle control architecture, and provide coordinated system control of the exemplary hybrid powertrain described in FIG. 1. The distributed control module system synthesizes pertinent information and inputs, and executes algorithms to control various actuators to meet control objectives, including objectives related to fuel economy, emissions, performance, drivability, and protection of hardware, including batteries of ESD 74 and the first and second electric machines 56 and 72. The distributed control module system includes an engine control module (hereafter 'ECM') 23, the TCM 17, a battery pack control module (hereafter 'BPCM') 21, and the TPIM 19. A hybrid control module (hereafter 'HCP') 5 provides supervisory control and coordination of the ECM 23, the TCM 17, the BPCM 21, and the TPIM 19. A user interface ('UI') 13 is operatively connected to a plurality of devices through which a vehicle operator controls or directs operation of the electro-mechanical hybrid powertrain. The devices include an accelerator pedal 113 ('AP'), an operator brake pedal 112 ('BP'), a transmission gear selector 114 ('PRNDL'), and a vehicle speed cruise control (not shown). The transmission gear selector 114 may have a discrete number of operator-selectable positions, including the rotational direction of the output member 64 to enable one of a forward and a reverse direction.

The aforementioned control modules communicate with other control modules, sensors, and actuators via a local area network (hereafter 'LAN') bus 6. The LAN bus 6 allows for structured communication of states of operating parameters and actuator command signals between the various control modules. The specific communication protocol utilized is application-specific. The LAN bus 6 and appropriate protocols provide for robust messaging and multi-control module interfacing between the aforementioned control modules, and other control modules providing functionality including e.g., antilock braking, traction control, and vehicle stability. Multiple communications buses may be used to improve communications speed and provide some level of signal redundancy and integrity. Communication between individual control modules can also be effected using a direct link, e.g., a serial peripheral interface ('SPI') bus (not shown).

The HCP 5 provides supervisory control of the hybrid powertrain, serving to coordinate operation of the ECM 23, TCM 17, TPIM 19, and BPCM 21. Based upon various input signals from the user interface 13 and the hybrid powertrain, including the ESD 74, the HCP 5 determines an operator torque request, an output torque command, an engine input torque command, clutch torque(s) for the applied torque-transfer clutches C1 70, C2 62, C3 73, C4 75 of the transmission 10, and the motor torques $T_A$ and $T_B$ for the first and second electric machines 56 and 72. The TCM 17 is operatively connected to the hydraulic control circuit 42 and provides various functions including monitoring various pressure sensing devices (not shown) and generating and communicating control signals to various solenoids (not shown) thereby controlling pressure switches and control valves contained within the hydraulic control circuit 42.

The ECM 23 is operatively connected to the engine 14, and functions to acquire data from sensors and control actuators of the engine 14 over a plurality of discrete lines, shown for simplicity as an aggregate bi-directional interface cable 35. The ECM 23 receives the engine input torque command from the HCP 5. The ECM 23 determines the actual engine input torque, $T_I$, provided to the transmission 10 at that point in time based upon monitored engine speed and load, which is communicated to the HCP 5. The ECM 23 monitors input from the rotational speed sensor 11 to determine the engine input speed to the input shaft 12, which translates to the transmission input speed, $N_I$. The ECM 23 monitors inputs from sensors (not shown) to determine states of other engine operating parameters including, e.g., a manifold pressure, engine coolant temperature, ambient air temperature, and ambient pressure. The engine load can be determined, for example, from the manifold pressure, or alternatively, from monitoring operator input to the accelerator pedal 113. The ECM 23 generates and communicates command signals to control engine actuators, including, e.g., fuel injectors, ignition modules, and throttle control modules, none of which are shown.

The TCM 17 is operatively connected to the transmission 10 and monitors inputs from sensors (not shown) to determine states of transmission operating parameters. The TCM 17 generates and communicates command signals to control the transmission 10, including controlling the hydraulic circuit 42. Inputs from the TCM 17 to the HCP 5 include estimated clutch torques for each of the clutches, i.e., C1 70, C2 62, C3 73, and C4 75, and rotational output speed, $N_O$, of the output member 64. Other actuators and sensors may be used to provide additional information from the TCM 17 to the HCP 5 for control purposes. The TCM 17 monitors inputs from pressure switches (not shown) and selectively actuates pressure control solenoids (not shown) and shift solenoids (not shown) of the hydraulic circuit 42 to selectively actuate the various clutches C1 70, C2 62, C3 73, and C4 75 to achieve various transmission operating range states, as described hereinbelow.

The BPCM 21 is signally connected to sensors (not shown) to monitor the ESD 74, including states of electrical current and voltage parameters, to provide information indicative of parametric states of the batteries of the ESD 74 to the HCP 5. The parametric states of the batteries preferably include battery state-of-charge, battery voltage, battery temperature, and available battery power, referred to as a range $P_{BAT\_MIN}$ to $P_{BAT\_MAX}$.

A brake control module (hereafter 'BrCM') 22 is operatively connected to friction brakes (not shown) on each of the vehicle wheels 93. The BrCM 22 monitors the operator input to the brake pedal 112 and generates control signals to control the friction brakes and sends a control signal to the HCP 5 to operate the first and second electric machines 56 and 72 based thereon.

Each of the control modules ECM 23, TCM 17, TPIM 19, BPCM 21, and BrCM 22 is preferably a general-purpose digital computer comprising a microprocessor or central processing unit, storage mediums comprising read only memory ('ROM'), random access memory ('RAM'), electrically programmable read only memory ('EPROM'), a high speed clock, analog to digital ('A/D') and digital to analog ('D/A') circuitry, and input/output circuitry and devices ('I/O') and appropriate signal conditioning and buffer circuitry. Each of the control modules has a set of control algorithms, comprising resident program instructions and calibrations stored in one of the storage mediums and executed to provide the respective functions of each computer. Information transfer between the control modules is preferably accomplished using the LAN bus 6 and serial peripheral interface buses. The control algorithms are executed during preset loop cycles such that each algorithm is executed at least once each loop cycle. Algorithms stored in the non-volatile memory devices are executed by one of the central processing units to monitor inputs from the sensing devices and execute control and diagnostic routines to control operation of the actuators, using preset calibrations. Loop cycles are executed at regular intervals, for example each 3.125, 6.25, 12.5, 25 and 100 milliseconds during ongoing operation of the hybrid powertrain. Alternatively, algorithms may be executed in response to the occurrence of an event.

The exemplary hybrid powertrain selectively operates in one of several operating range states that can be described in terms of an engine state comprising one of an engine-on state ('ON') and an engine-off state ('OFF'), and a transmission state comprising a plurality of fixed gears and continuously variable operating modes, described with reference to Table 1, below.

TABLE 1

| Description | Engine State | Transmission Operating Range State | Applied Clutches | |
| --- | --- | --- | --- | --- |
| M1_Eng_Off | OFF | EVT Mode 1 | C1 70 | |
| M1_Eng_On | ON | EVT Mode 1 | C1 70 | |
| G1 | ON | Fixed Gear Ratio 1 | C1 70 | C4 75 |
| G2 | ON | Fixed Gear Ratio 2 | C1 70 | C2 62 |
| M2_Eng_Off | OFF | EVT Mode 2 | C2 62 | |
| M2_Eng_On | ON | EVT Mode 2 | C2 62 | |
| G3 | ON | Fixed Gear Ratio 3 | C2 62 | C4 75 |
| G4 | ON | Fixed Gear Ratio 4 | C2 62 | C3 73 |

Each of the transmission operating range states is described in the table and indicates which of the specific clutches C1 70, C2 62, C3 73, and C4 75 are applied for each of the operating range states. A first continuously variable mode, i.e., EVT Mode 1, or M1, is selected by applying clutch C1 70 only in order to "ground" the outer gear member of the third planetary gear set 28. The engine state can be one of ON ('M1_Eng_On') or OFF ('M1_Eng_Off'). A second continuously variable mode, i.e., EVT Mode 2, or M2, is selected by applying clutch C2 62 only to connect the shaft 60 to the carrier of the third planetary gear set 28. The engine state can be one of ON ('M2_Eng_On') or OFF ('M2_Eng_Off'). For purposes of this description, when the engine state is OFF, the engine input speed is equal to zero revolutions per minute ('RPM'), i.e., the engine crankshaft is not rotating. A fixed gear operation provides a fixed ratio operation of input-to-output speed of the transmission 10, i.e., $N_I/N_O$. A first fixed gear operation ('G1') is selected by applying clutches C1 70 and C4 75. A second fixed gear operation ('G2') is selected by applying clutches C1 70 and C2 62. A third fixed gear operation ('G3') is selected by applying clutches C2 62 and C4 75. A fourth fixed gear operation ('G4') is selected by applying clutches C2 62 and C3 73. The fixed ratio operation of input-to-output speed increases with increased fixed gear operation due to decreased gear ratios in the planetary gears 24, 26, and 28. The rotational speeds of the first and second electric machines 56 and 72, $N_A$ and $N_B$ respectively, are dependent on internal rotation of the mechanism as defined by the clutching and are proportional to the input speed measured at the input shaft 12.

In response to operator input via the accelerator pedal 113 and brake pedal 112 as captured by the user interface 13, the HCP 5 and one or more of the other control modules determine torque commands to control the torque generative devices comprising the engine 14 and first and second electric machines 56 and 72 to meet the operator torque request at the output member 64 and transferred to the driveline 90. Based upon input signals from the user interface 13 and the hybrid powertrain including the ESD 74, the HCP 5 determines the operator torque request, a commanded output torque from the transmission 10 to the driveline 90, an input torque from the engine 14, clutch torques for the torque-transfer clutches C1 70, C2 62, C3 73, C4 75 of the transmission 10; and the motor torques for the first and second electric machines 56 and 72, respectively, as is described hereinbelow.

Final vehicle acceleration can be affected by other factors including, e.g., road load, road grade, and vehicle mass. The operating range state is determined for the transmission 10 based upon a variety of operating characteristics of the hybrid powertrain. This includes the operator torque request communicated through the accelerator pedal 113 and brake pedal 112 to the user interface 13 as previously described. The operating range state may be predicated on a hybrid powertrain torque demand caused by a command to operate the first and second electric machines 56 and 72 in an electrical energy generating mode or in a torque generating mode. The operating range state can be determined by an optimization algorithm or routine which determines optimum system efficiency based upon operator demand for power, battery state of charge, and energy efficiencies of the engine 14 and the first and second electric machines 56 and 72. The control system manages torque inputs from the engine 14 and the first and second electric machines 56 and 72 based upon an outcome of the executed optimization routine, and system efficiencies are optimized thereby, to manage fuel economy and battery charging. Furthermore, operation can be determined based upon a fault in a component or system. The HCP 5 monitors the torque-generative devices, and determines the power output from the transmission 10 required in response to the desired output torque at output member 64 to meet the operator torque request. As should be apparent from the description above, the ESD 74 and the first and second electric machines 56 and 72 are electrically-operatively coupled for power flow therebetween. Furthermore, the engine 14, the first and second electric machines 56 and 72, and the electro-mechanical transmission 10 are mechanically-operatively coupled to transfer power therebetween to generate a power flow to the output member 64.

Figure 3A:
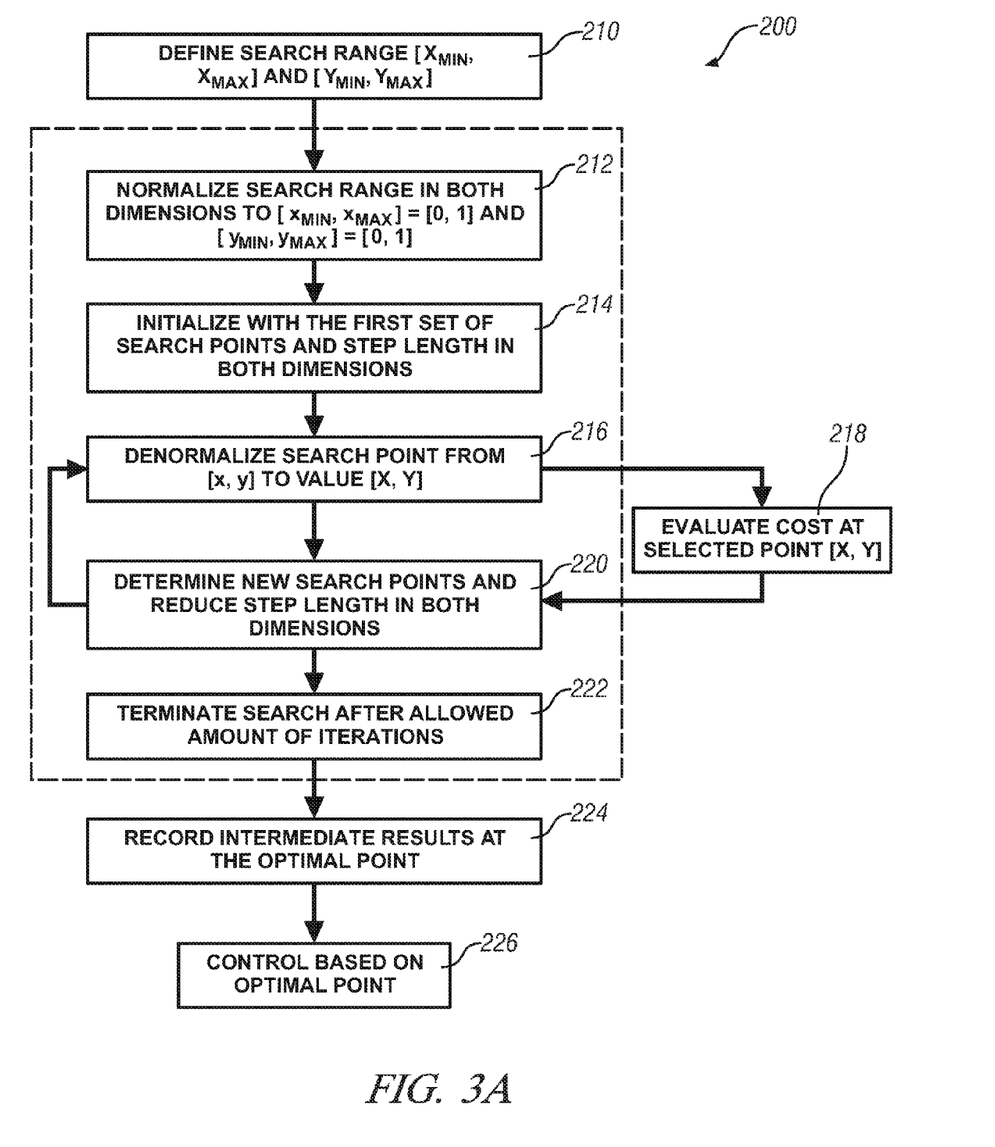
FIG. 3A and FIG. 3B are process flow diagrams of an exemplary method for controlling input speed and torque from an engine, in accordance with the present disclosure.
Figure 3B:
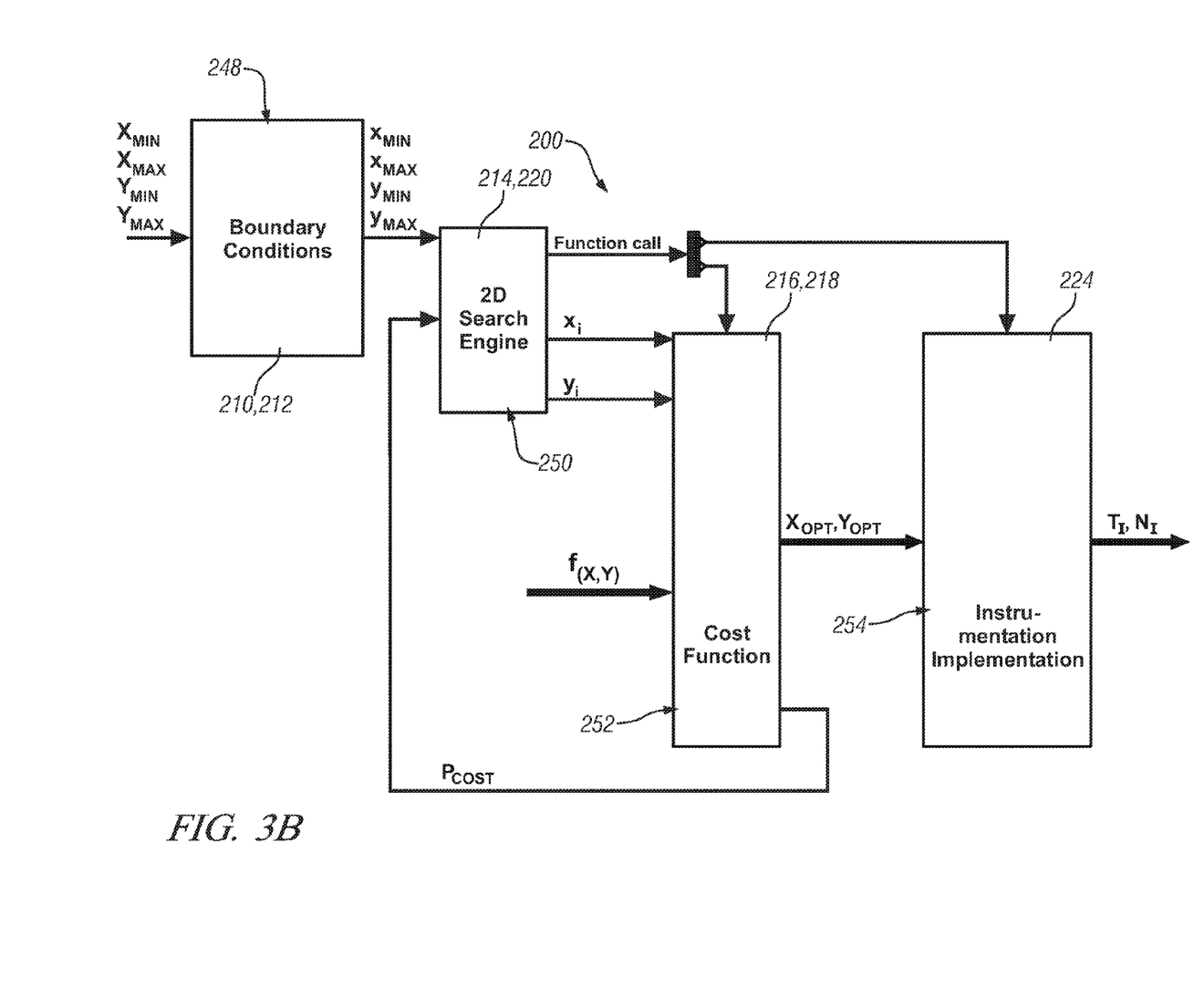
Figure 4:
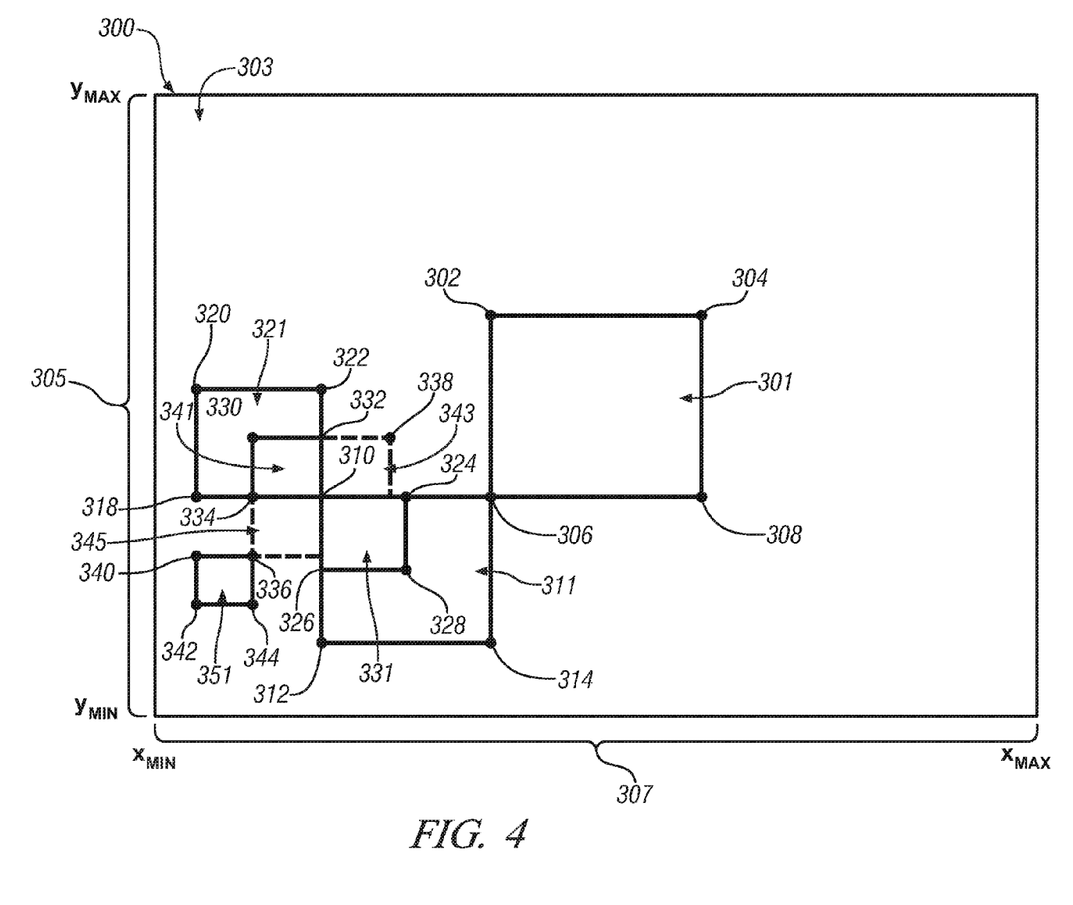
FIG. 4 is a graphical representation of a first exemplary search, in accordance with the present disclosure.
Figure 5:
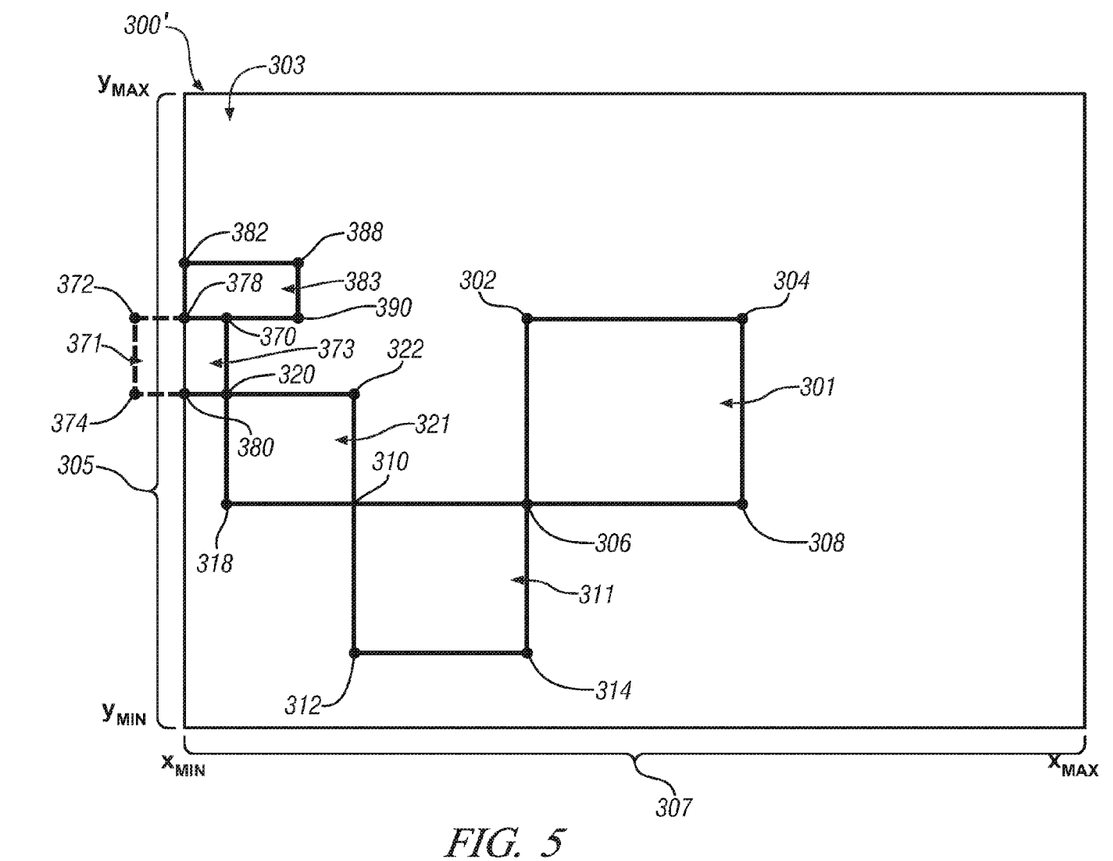
FIG. 5 is a graphical representation of a second exemplary search, in accordance with the present disclosure.

FIG. 3A and FIG. 3B show a method 200 to determine a preferred operating point for the engine 14 in response to the operator torque request $T_{O\_REQ}$ and FIG. 4 and FIG. 5 graphically show a graph 300 and a graph 300', respectively of exemplary searches performed utilizing the method 200. The method 200 is preferably utilized during operation in the first and second continuously variable modes to control the input power $P_I$ from the engine 14 described with reference with the input speed $N_I$ the input torque $T_I$ from the engine 14. During the first and second continuously variable modes, the transmission 10 transmits mechanical power using one clutch, i.e., either clutch C1 62 or C2 70 from the engine 14, and the engine 14 operates at a preferred operating point. The engine 14 is controlled at the operating point by executing algorithms and calibrations in the HCP 5 that includes conducting a two-dimensional search to determine the preferred engine operating point.

FIG. 3A shows a flowchart of the method 200 and FIG. 3B shows programming functions utilized by the HCP 5 when implementing the method 200 including a boundary condition definition program 248, a search engine 250, a cost function 252, and an instrumentation implementation 254.

Boundary conditions comprising a range of permissible input power values associated with the engine operating points are defined (210, 248). The boundary conditions define a two-dimensional search area 303. The two-dimensional search area 303 is determined based upon the input power $P_I$ transmitted from the engine 14 to the transmission 10. In an exemplary embodiment, the two-dimensional search area 303 comprises a range of permissible input power values from −1 kW to 40 kW and a range of permissible input speed values from 600 RPM to 2000 RPM. In alternate embodiments, the two-dimensional search area 303 comprises one of a range of permissible input speed values and a range of permissible input torque values and a range of permissible input power values and the range of permissible input torque values.

The range of permissible input power values are associated with engine input power include input power values ['Y'] from a minimum permissible input power [' $Y_{MIN}$ '] to a maximum permissible input power [' $Y_{MAX}$ ']. The range of permissible input speed values from the engine 14 include input speed values ['X'] from a minimum permissible input speed [' $X_{MIN}$ '] to a maximum permissible input speed [' $X_{MAX}$ ']. The HCP 5 utilizes the output speed $N_O$ of the transmission 12 and the operator torque request $T_{O\_REQ}$ in a lookup table (not shown) to obtain the minimum permissible input power $Y_{MIN}$, the maximum permissible input power $Y_{MAX}$, the minimum permissible input speed $X_{MIN}$, and the maximum permissible input speed $X_{MAX}$. In alternative embodiments, the minimum permissible input power $Y_{MIN}$, the maximum permissible input power $Y_{MAX}$, the minimum permissible input speed $X_{MIN}$, and the maximum permissible input speed $X_{MAX}$ can be based on measurements of other operating properties of the powertrain.

The maximum permissible input power $Y_{MAX}$ and the minimum permissible input power $Y_{MIN}$ are normalized (212) such that the maximum permissible input power $Y_{MAX}$ corresponds to a normalized maximum input power [' $y_{MAX}$ '], which has a value of one, and the minimum permissible input power $Y_{MIN}$ corresponds to a normalized minimum permissible input power [' $y_{MIN}$ '], which has a value of zero. The maximum permissible input speed $X_{MAX}$ and the minimum permissible input speed $X_{MIN}$ are normalized (212) such that the maximum permissible input speed $X_{MAX}$ corresponds to a normalized maximum permissible input speed [' $x_{MAX}$ '], which has a value of one, and the minimum permissible input speed $X_{MIN}$ corresponds to a normalized minimum permissible input speed [' $x_{MIN}$ '], which has a value of zero.

The HCP 5 iteratively identifies operating points within the search area 303 (214). The operating points include x/y coordinates in which x values correspond to normalized speed values and y values correspond to normalized power values. The HCP 5 identifies a first set of candidate operating points including an operating point 302, an operating point 304, an operating point 306, and an operating point 308.

In one embodiment, the HCP 5 determines the first set of candidate operating points such that the candidate operating points define corners of a rectangle 301, and the rectangle 301 is centered within the search area 303. The rectangle 301 can have a length and width that is off-line optimized based on specific cost functions, allowed maximum iteration number, and desired search accuracy.

The HCP 5 denormalizes each candidate operating point (x,y) of the first set of candidate operating points to their corresponding values (X,Y) using scaling based on normalization (216). The HCP 5 calculates an operating cost $P_{COST}$ to operate the engine 14 associated with each candidate engine operating point 302, 304, 306, 308 and associated with the operator torque request $T_{O\_REQ}$ and the output speed $N_O$ of the transmission 10 by executing a cost function $f(X,Y, N_O, T_{O\_REQ})$ (252). The HCP 5 calculates an operating cost to operate the internal combustion engine and the electro-mechanical transmission 10 to meet the operator torque request $T_{O\_REQ}$ for each candidate engine operating point within each of the subregions. The HCP 5 determines the speed relationship as defined shown in Eq. 1, below:

$$\begin{bmatrix} N_A \\ N_B \end{bmatrix} = \begin{bmatrix} b_{11} & b_{12} \\ b_{21} & b_{22} \end{bmatrix} \begin{bmatrix} N_I \\ N_O \end{bmatrix} \quad [1]$$

wherein, $N_O$ is the output speed, $N_A$ is the operating speed for the first electric machine 56, $N_B$ is the operating speed for the second electric machine 72, and $b_{11}, b_{12}, b_{21}, b_{22}$, are known scalar values determined for the specific application in the specific operating range state. Therefore, the determined scalar values for $b_{11}, b_{12}, b_{21}, b_{22}$ are specific to each of EVT Mode 1 and EVT Mode 2. In this application, when the transmission output speed, $N_O$ is known, there is one degree of freedom in input speed $N_I$, by which $N_A$ and $N_B$ can be determined.

The HCP 5 determines the torque using the relationship as shown in Eq. 2, below:

$$\begin{bmatrix} T_A \\ T_B \end{bmatrix} = \begin{bmatrix} d_{11} & d_{12} & d_{13} & d_{14} \\ d_{21} & d_{22} & d_{23} & d_{24} \end{bmatrix} \begin{bmatrix} T_I \\ T_O \\ \dot{N}_I \\ \dot{N}_O \end{bmatrix} \quad [2]$$

wherein the output torque $T_O$ of the transmission 10 is set to the operator torque request $T_{O\_REQ}$, $T_A$ and $T_B$ are the operating torques for MG-A 56 and MG-B 72, $\dot{N}_I$ and $\dot{N}_O$ represent time-rate changes in input speed from the engine 14 and output speed of the transmission 10, and $d_{11}, d_{12}, d_{13}, d_{14}, d_{21}, d_{22}, d_{23}, d_{24}$ are known scalar values determined for each operating range state, i.e., either one of EVT Mode 1 and EVT Mode 2, of the application. In this application, when the output torque $T_O$ is known, there is one degree of torque freedom for input torque $T_I$, by which $T_A$ and $T_B$ can be determined.

The cost function $f(X,Y)$ 252 comprises operating costs which are generally determined based upon factors that include vehicle driveability, fuel economy, emissions, and battery usage. Furthermore, costs are assigned and associated with fuel and electrical power consumption and are further associated with a specific operating points of the powertrain. Lower operating costs are generally associated with lower fuel consumption at high conversion efficiencies, lower battery power usage, and lower emissions for an operating point, and closer proximity to the current operating state of the powertrain system.

The HCP 5 calculates a cost $P_{COST302}$, a cost $P_{COST304}$, a cost $P_{COST306}$, and a cost $P_{COST308}$ for the corresponding operating points 302, 304, 306, 308, respectively. The HCP 5 performs a base point determination by determining which of the costs $P_{COST302}$, $P_{COST304}$, $P_{COST306}$, $P_{COST308}$ has the lowest value, and determines the point associated with the lowest value as the a base point for the first set of operating points. FIG. 4 depicts an exemplary embodiment in which the HCP 5 identifies a lowest cost of the first set of operating points to be cost $P_{COST306}$ and therefore, identifies the operating point 306 as the base point for the first set of operating points.

The HCP 5 determines a second set of candidate operating points (220) utilizing the search engine 250. In an exemplary embodiment, the search engine 250 selects a search direction relative to the first set of candidate operating points based on the base point by extending the search direction from the base point away from the first set of operating points. The HCP 5 determines the second set of operating points including candidate operating points 310, 312, and 314 along with the candidate operating point 306, which was the base point for the first set of candidate operating points. The second set of candidate operating points defines a rectangle 311 having a common corner at the candidate operating point 306 with the rectangle 301 of the first set of candidate operating points.

In one embodiment, the rectangle 311 is smaller than the rectangle 301 such that search resolution increases between the first set of candidate operating points and the second set of candidate operating points. In one embodiment, each side of the rectangle 311 is a fraction of the length of corresponding side of the rectangle 301.

The HCP 5 denormalizes the operating points (x,y) of the second set of candidate operating points to their corresponding speed and power values (X,Y) 216. The HCP 5 inputs the speed and power values (X,Y) of the second set of operating points into a cost function $f(X,Y)$. The HCP 5 calculates a cost $P_{COST310}$, a cost $P_{COST312}$, and a cost $P_{COST314}$ for operating points 310, 312, 314, respectively. The HCP 5 performs a base point determination by determining which of the costs $P_{COST310}$, $P_{COST312}$, $P_{COST314}$, $P_{COST306}$ have the lowest value, and determines the point associated with the lowest value as the a base point for the second set of candidate operating points. FIG. 4 depicts an exemplary embodiment in which the cost $P_{COST310}$ and has the lowest cost and therefore, the candidate operating point 310 is the base point of the second set of candidate operating points.

The HCP 5 utilizes the cost function 252 and the search engine 250 to iteratively determine sets of candidate operating points based on the base point of each previously determined set of candidate operating points. The HCP 5 utilizes search engine 250 to identify a third set of candidate operating points comprising operating points 318, 320, 322, along with candidate operating point 310, which is the previously determined base point. The third set of candidate operating points defines corners of a rectangle 321. The search engine 250 identifies a fourth set of candidate operating points comprising candidate operating points 324, 326, 328, along with candidate operating point 310 which is the previously determined base point. The fourth set of candidate operating points defines corners of a rectangle 331. The search engine 250 identifies a fifth set of candidate operating points comprising candidate operating points 330, 332, 334, along with candidate operating point 310, which is the previous determined base point. The fifth set of candidate operating points defines corners of a fifth rectangle 341.

When the HCP 5 evaluates three consecutive sets of candidate operating points, and determines that the base point in each set of candidate operating points is the same, the HCP 5 determines a sixth set of candidate operating points utilizing rectangles having a common side to a previously determined rectangle. In one embodiment, the HCP 5 determines a sixth set of candidate operating points comprising candidate operating point 336 and candidate operating point 338. The candidate operating point 338 defines a corner of a rectangle 343 opposite a corner of the rectangle 343 defined by the candidate operating point 310. The rectangle 343 comprises a rectangle having the same shape and size as the previously determined rectangle 341 and shares a common side and with the rectangle 341 (that is, a side defined by candidate operating point 310 and candidate operating point 332). The candidate operating point 336 defines a corner of a rectangle 345 opposite to a corner of the rectangle 345 defined by the candidate operating point 310. The rectangle 345 comprises a rectangle having the same shape and size as the previously determined rectangle 341 and shares a common side and with the rectangle 341 (that is, a side defined by operating point 310 and candidate operating point 334).

The HCP 5 denormalizes each operating point (x,y) of the sixth set of candidate operating points to their corresponding engine speed and engine power values (X,Y) (216). The HCP 5 inputs the speed and power values (X,Y) of the sixth set of operating points into a cost function f(X,Y) 252 to determine the overall cost $P_{COST}$ (218).

The HCP 5 calculates a cost $P_{COST336}$, and a cost $P_{COST338}$ for operating points 336, 338, respectively. The HCP 5 performs a base point determination by determining which of the cost $P_{COST310}$, the cost $P_{COST336}$, the cost $P_{COST338}$, and the cost $P_{COST310}$ has the lowest value, and determines the point associated with the lowest value as the a base point for the sixth set of operating points. FIG. 4 depicts an exemplary embodiment in which the HCP 5 determines a lowest cost of the above set of operating points to be cost $P_{COST336}$ and therefore, determines the candidate operating point 336 as the base point for the sixth set of candidate operating points.

The search engine 214 determines a seventh set of candidate operating points comprising candidate operating points 340, 342, 344 along with the candidate operating point 336. The seventh set of candidate operating points define a rectangle 351 extending away from the candidate operating point 310.

FIG. 5 shows a graph 300' of another exemplary search performed utilizing the method 200. The graph 300' includes the first and second set of candidate operating points and the first and second search rectangles of the first and second search iterations shown by the graph 300. However, FIG. 5 depicts an embodiment in which the HCP 5 determines a lowest cost of the third set of operating points to be cost $P_{COST320}$ and therefore, determines the operating point 320 as the base point for the third set of operating points.

The HCP 5 identifies a fourth set of candidate operating points (220) utilizing the search engine 250. The HCP 5 selects a set of candidate operating points for the fourth set of candidate operating points including operating points 320, point 370, 372, 374. However, candidate operating points 372 and candidate operating point 374 have a normalized input speed value x outside the permissible range of normalized speed values 307 (that is a value x that is less than $x_{MIN}$.) The HCP 5 sets the normalized input speed value x for candidate operating points 372 and 374 to the minimum permissible input speed $x_{MIN}$, thereby determining new candidate operating points 378 and 380. The HCP 5 identifies a fourth set of candidate operating point including the operating point 320, the operating point 370, the operating point 378, and the operating point 380.

The HCP 5 calculates a cost $P_{COST370}$, a cost $P_{COST378}$, and a cost $P_{COST380}$ for candidate operating points 370, 378 380, respectively. The HCP 5 performs a base point determination by determining which of the cost $P_{COST320}$, the cost $P_{COST370}$, the cost $P_{COST378}$, and the cost $P_{COST380}$ has the lowest value, and determines the point associated with the lowest value as the a base point for the fourth set of candidate operating points. FIG. 5 depicts an exemplary embodiment in which the HCP 5 determines a lowest cost of the fourth set of candidate operating points to be cost $P_{COST378}$ and therefore, determines the candidate operating point 378 as the base point for the fourth set of operating points.

When the HCP 5, determines a base point comprising a limit value, that is either minimum permissible input speed $x_{MIN}$, maximum permissible input speed $x_{MAX}$, minimum permissible input power $y_{MIN}$, or maximum permissible input power $y_{MAX}$, the HCP 5 determines a set of candidate operating points such that the set of candidate operating points rebound away from the search limit. The HCP 5 selects a fifth set of candidate operating points comprising the candidate operating point 378, the candidate operating point 382, the candidate operating point 388, and the candidate operating point 390. The fifth set of candidate operating points defines a rectangle 383. Further, when the base point includes a limit value, the HCP 5 selects candidate operating points to form a rectangle having two sides with an increased length over the length associated with the rectangle of a current set of candidate operating points. For example, the distance between the candidate operating point 378 and the candidate operating point 380, and the distance between the candidate operating point 382 and the candidate operating point 388 are greater than the space normally associated with candidate operating points of a fifth set of candidate operating points in x direction, thereby allowing the search engine 250 to evaluate candidate operating points away from the boundary of the minimum permissible input power $x_{MIN}$.

The HCP 5 continues to perform steps 216, 218, and 220 until a selected number of iterations are performed (222). In one exemplary embodiment nine iterations are performed.

In one embodiment, the HCP 5 calculates costs until a selected number of costs are calculated. In one embodiment, the HCP 5 calculates costs for twenty-eight candidate operating points. The candidate operating point associated with the lowest cost after the selected number of costs are calculated is an preferred operating point associated with the preferred speed value $X_{OPT}$ and the preferred power value $Y_{OPT}$.

The HCP 5 utilizing the method 200 determines the normalized preferred speed value $x_{OPT}$ and a normalized preferred power value $y_{OPT}$ rapidly due to the separation of the search engine 250 and the cost function 252. In particular, the search engine 250 rapidly determines sets of candidate operating points and provides each set of candidate operating points to the cost function 252 such that the cost function 252 only has to solve for one unknown variable per candidate operating point. The HCP 5 utilizing the method 200 calculates twenty-eight cost values in less than twenty-five milliseconds.

In alternative embodiments, the HCP 5 performs other amounts of cost calculations. Further, in other alternative embodiments, the HCP 5 performs cost calculations until a selected amount of time elapses or until a selected search tolerance level is reached.

In alternative exemplary embodiments, the search engine can utilize other types of search functions. In one embodiment, a search engine iteratively generates combinations of inputs over the entire range of permissible input torques $T_{I\_MIN}$ to $T_{I\_MAX}$, and over the entire range of permissible input speeds $N_{I\_MIN}$ to $N_{I\_MAX}$. In one embodiment, a search engine selects initial values for input torque and input speed, calculates costs associated with the initial values input torque and input speeds and divides the permissible search area into subsections based on the costs calculations.

In one embodiment, a search engine selects initial values for input torque and input speed that have a golden ratio of relative ranges of a search area, determines costs associated with the initial values input torque and input speeds and exclude certain search area (that is, decreasing the size of the permissible search area) based on the output costs.

In other embodiments, the search engine determines candidate operating points that define corners a geometric shape (such as, for example, a square or a triangle). The search engine evaluates costs based on torque values and speed values associated with each operating point. The search engine then utilizes the operating points to define new corners of a second shape. The second shape differs from the first shape by at least one of size, rotational orientation, location or number of corners, or angles of corners.

The intermediate results (for example various components of the preferred cost) associated with $X_{OPT}$, $Y_{OPT}$ are recorded (224) for implementation by instrumentation and in system diagnostics. In one embodiment, intermediate results associated with $X_{OPT}$, $Y_{OPT}$ are accessed during vehicle diagnostics to determine if the algorithm is selecting preferred engine operating points.

The powertrain is controlled based on the preferred operating point ($x_{OPT}$, $y_{OPT}$) (226) as determined by the search engine 250 and the cost function 252. The values for $X_{OPT}$ is correlated with preferred engine speed $N_{I\_OPT}$. Preferred input torque $T_{I\_OPT}$ is determined by dividing $Y_{OPT}$ by the preferred engine speed $X_{I\_OPT}$ to give the preferred input torque $T_{I\_OPT}$.

As mentioned above, the HCP 5 utilizes the method 200 to control the transmission 10 in the first or second continuously variable modes. The HCP 5 controls the input speed and input torque of the engine utilizing Eqs. 1 and 2 as described wherein the input speed $N_I$ is set to the optimal input speed $N_{I\_OPT}$, and wherein the input torque $T_I$ and is set to the optimal input torque $T_{I\_OPT}$.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method to determine a preferred operating point for an internal combustion engine mechanically coupled to an electro-mechanical transmission to transmit power to a driveline in response to an operator torque request, wherein a controller executes the following:
   determining a current set of candidate operating points for a current search iteration;
   iteratively
      determining an operating cost for operating the internal combustion engine at each candidate operating point of the current search iteration,
      determining one of the candidate operating points for the current search iteration having a lowest of the operating costs,
      determining a search direction relative to the current set of candidate operating points for the current search iteration based on the candidate operating point of the current search iteration having the lowest operating cost, and
      determining a subsequent set of candidate operating points for a subsequent search iteration based upon the search direction;
   wherein the current set of candidate operating points for the current search iteration and the subsequent set of candidate operating points for the subsequent search iteration have a common operating point;
   selecting the subsequent set of candidate operating points for the subsequent search iteration that define a rectangle having a common side with a rectangle defined by the current set of candidate operating points for the current search iteration when the same candidate operating point is identified as a base point for three consecutive iterations;
   determining the preferred operating point for operating the internal combustion engine comprising the candidate operating point with the lowest operating cost determined after a predetermined number of iterations; and
   controlling the powertrain based on the preferred operating point for the internal combustion engine.

2. The method of claim 1, further comprising:
   determining an operator torque request;
   defining a search area based upon the operator torque request; and
   iteratively determining sets of candidate operating points within the search area.

3. The method of claim 2, further comprising determining a first candidate operating point outside the search area and identifying a second candidate operating point within the search area, wherein the current set of candidate operating points for the current search iteration includes the second candidate operating point.

4. The method of claim 1, wherein determining the current set of candidate operating points for the current search iteration and the subsequent set of candidate operating points for the subsequent search iteration comprises defining rectangles within the search area.

5. The method of claim 1, further comprising identifying a base point for the candidate operating points for the current search iteration, and determining the search direction based on the identified base point.

6. The method of claim 1, comprising increasing the search resolution during each subsequent search iteration.

7. The method of claim 1, wherein the predetermined number of iterations is nine iterations.

8. The method of claim 1, comprising determining the operating cost for twenty-eight candidate operating points.

9. The method of claim 1, wherein calculating an operating cost comprises calculating an operating cost associated with at least one of vehicle driveability, fuel economy, emissions, and battery usage.

10. The method of claim 1, further comprising:
    monitoring an operator torque request; and
    calculating an operating cost based on the operator torque request.

11. The method of claim 1, further comprising recording in a storage medium a speed value and a torque value utilized for operating the internal combustion engine.

12. The method of claim 1, wherein determining the current set of candidate operating points of the current search iteration comprises determining four candidate operating points.

13. A method to determine a preferred operating point for an internal combustion engine mechanically coupled to an electro-mechanical transmission to transmit power to a driveline in response to an operator torque request, wherein a controller executes the following;
- defining a search area comprising operating points for the internal combustion engine;
- determining a current set of candidate operating points for a current search iteration within the search area;
- iteratively
  - determining an operating cost for operating the internal combustion engine at each candidate operating point of the current search iteration,
  - determining a candidate operating point for the current search iteration having a lowest operating cost,
  - determining a search direction relative to the current set of candidate operating points for the current search iteration based on the candidate operating point of the current search iteration having the lowest operating cost, and
  - determining a subsequent set of candidate operating points for a subsequent search iteration based upon the search direction;
- determining the preferred operating point for operating the internal combustion engine comprising the candidate operating point with the lowest operating cost determined after a predetermined number of iterations, wherein the subsequent set of candidate operating points for the subsequent search iteration have a common side with the current set of candidate operating points for the current search iteration when the same candidate operating point is identified as a base point for three consecutive iterations and the current set of candidate operating points for the current search iteration and the subsequent set of candidate operating points for the subsequent search iteration have a common operating point and
- controlling the powertrain based on the preferred operating point for the internal combustion engine.

14. The method of claim 13, wherein each candidate operating point comprises an input speed and an input power.

15. The method of claim 13, wherein each candidate operating point comprises an input speed and an input torque.

16. The method of claim 13, wherein calculating an operating cost comprises calculating an operating cost associated with at least one of vehicle driveability, fuel economy, emissions, and battery usage.

17. The method of claim 13, further comprising:
- determining an operator torque request; and
- defining the search area based upon the operator torque request.

18. The method of claim 13, wherein determining the current set of candidate operating points of the current search iteration comprises determining four candidate operating points.

* * * * *